G. W. GOODWYN.
Coffee-Pot.
No. 203,137. Patented April 30, 1878.
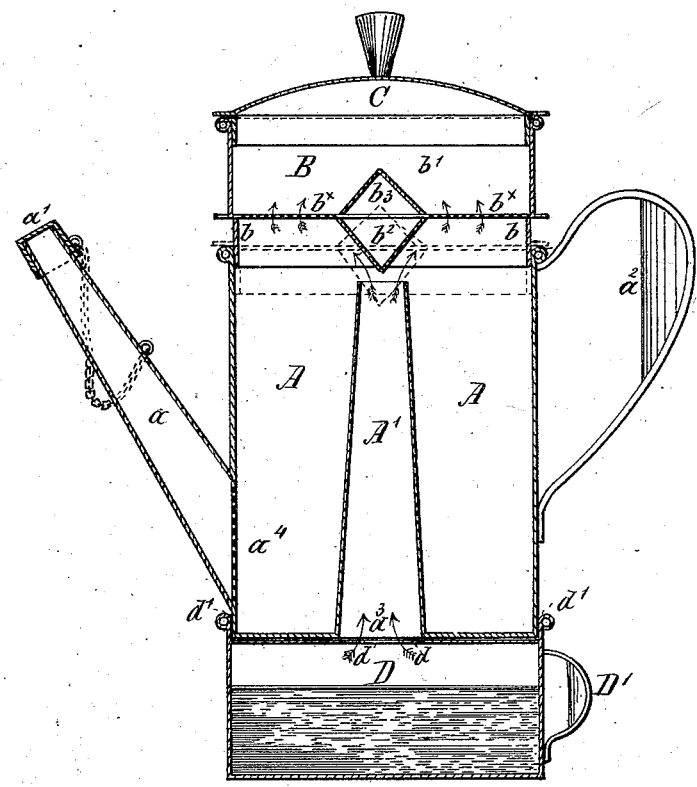
Witnesses
Alf. L. Leonard
Henri Guillaume
Inventor
George W. Goodwyn
pr. Henry Orth
atty.

UNITED STATES PATENT OFFICE.

GEORGE W. GOODWYN, OF PETERSBURG, VIRGINIA, ASSIGNOR OF ONE-FOURTH HIS RIGHT TO HENRY A. TAYLOR, OF SAME PLACE.

IMPROVEMENT IN COFFEE-POTS.

Specification forming part of Letters Patent No. 203,137, dated April 30, 1878; application filed April 1, 1878.

*To all whom it may concern:*

Be it known that I, GEORGE W. GOODWYN, of the city of Petersburg and county of Dinwiddie, in the State of Virginia, have invented new and useful Improvements in Coffee-Pots; and I do hereby declare that the following is a full, clear, and exact description thereof, reference being had to the accompanying drawing, in which I have illustrated my invention by a vertical transverse section.

In the process of making decoctions of substances containing narcotics, such as tea or coffee, and essential oils of powerful aroma, it is necessary to make these decoctions in closed vessels to avoid the elimination or loss of the components above alluded to. Hence boiling in open vessels is a great objection; in fact, tea or coffee should not be boiled at all if the theine and caffeine alone are sought to be obtained; and the mode or process adopted by the more skilled is by steeping or by pouring hot water upon the tea or coffee contained in or placed upon a strainer in a closed vessel. In this manner good coffee or tea may be produced, though with considerable waste, as the most of the aroma—or, more properly, the theine or caffeine—is left behind, while an essential portion of the aroma is lost while pouring on the water.

To remedy these defects is the object of this invention, which consists in the improved construction and arrangement of apparatus hereinafter more fully described, and illustrated in the drawings hereto annexed, in which—

A is the coffee or tea pot, provided with the usual spout $a$, adapted to be closed by a tight-fitting cap, $a^1$, and having the strainer $a^4$, which, however, may be dispensed with, unless the coffee is ground very fine; and I generally employ at the spout a strainer of very small meshes, much smaller than those of the strainer B. The coffee-pot is further provided with the usual handle $a^2$.

A' is a central tapering tube, open at both ends, for a purpose hereinafter described. B is the strainer, formed into two compartments, $b$ $b^1$, by the perforated diaphragm or strainer $b^\times$.

$b^2$ $b^3$ are two imperforate cones, soldered or otherwise affixed to the under and upper sides of the diaphragm, respectively. The lower cone, $b^2$, serves the purpose of diverging or deflecting the steam rising from a vessel, D, containing water, so that said steam will be directed over the whole surface of the strainer or diaphragm $b^\times$. It also serves the purpose of a valve, as it will be readily seen that by pushing the strainer B fully down into the coffee-pot the cone $b^2$ will close the orifice of tube A', to shut off the steam or to regulate its admission to the under surface of the strainer. The upper cone, $b^3$, serves the purpose of keeping the tea or coffee from that part of the diaphragm covered by the lower cone or valve, as otherwise all the coffee or tea over the cone $b^2$ would not be affected, or, at least, imperfectly acted upon by the steam.

D is a water-reservoir, provided with a central aperture, $d$, and a projecting flange, $d'$, forming a recess, into which the pot A is set, while the reservoir D is placed upon the stove. The aperture $a^3$, at the lower extremity of tube A', coincides with the aperture $d$ in top of reservoir D, the steam following the path indicated by the arrows.

The lower part of the strainer B is made to fit tightly into the upper part of the coffee-pot, so that it may be held in any desired position for the regulation or shutting off of the steam by frictional contact. If desired, however, a binding-screw secured below the upper flange of the coffee-pot, and bearing upon the lower part of the strainer, may be employed. The upper compartment, $b^1$, of the strainer B is of the same internal diameter as the coffee-pot A, so that the lid C may be employed upon the pot A when the strainer is removed and the coffee is to be served; and the generator D may be provided with a suitable handle or handles, D'.

It will be seen that by forming tube A' tapering in one direction, and the cone $b^3$ tapering in a reverse direction, the upper part of the tube is made to form a valve-seat, and the cone performs the functions of a valve; and by means of the general construction of the coffee-pot A the decoction is produced by concentration of the steam, as will be readily understood.

A further advantage is obtained by my improved construction, in so far that the vessel D serves as a means for keeping the fluid in the pot A' warm for any length of time without reducing its volume by evaporation or causing it to be deteriorated by boiling.

Under some circumstances I may employ an escape-tube upon the vessel D, provided with a stop-cock or a valve to permit the escape of the steam when not required for making the decoction, though for ordinary family use this is not necessary, as the steam, when produced in such volume as not to find access into the coffee-pot, or in case the valve is accidentally closed, will find egress around the coffee-pot at its base, the said coffee-pot and reservoir D not being connected steam-tight; and the coffee or tea once made, the vessel is removed to a cooler portion of the stove, and the water therein ceases boiling.

Having now described my invention, what I claim, and desire to secure by Letters Patent, is—

1. In an apparatus for making decoctions of tea, coffee, and other like substances, the combination of a fluid-reservoir provided with a steam-duct connected to the bottom of said reservoir and open at both ends, a removable steam-generator, an adjustable perforated receiver, upon which the substances are placed, and an imperforate cone connected to said receiver, and adapted to act as a valve to regulate the admission of steam, substantially as described, for the purpose specified.

2. The combination, with the vessel A, having a central annular steam-tube, A', with the vessel or generator D and the strainer B, provided with a perforated diaphragm and an imperforate conical deflector, $b^2$, arranged and operating substantially as described, for the purpose specified.

3. The combination, with the vessel A, having a central annular and tapering steam-tube, A', the upper part of which forms a valve-seat, and the vessel or generator D, with the strainer B, adapted to be adjusted upon the vessel A, the diaphragm $b^x$, and the imperforate cone-valve $b^2$, all arranged and operating substantially as described, for the purpose specified.

4. The combination, with the tube A', of the imperforate cones $b^2$ $b^3$ and the perforated diaphragm $b^x$ of the strainer B, arranged and operating substantially as described, for the purpose specified.

In witness that I claim the foregoing I have hereunto set my hand this 26th day of March, 1878.

GEO. W. GOODWYN.

Witnesses:
W. E. MORRISON,
R. MORRISON.